UNITED STATES PATENT OFFICE.

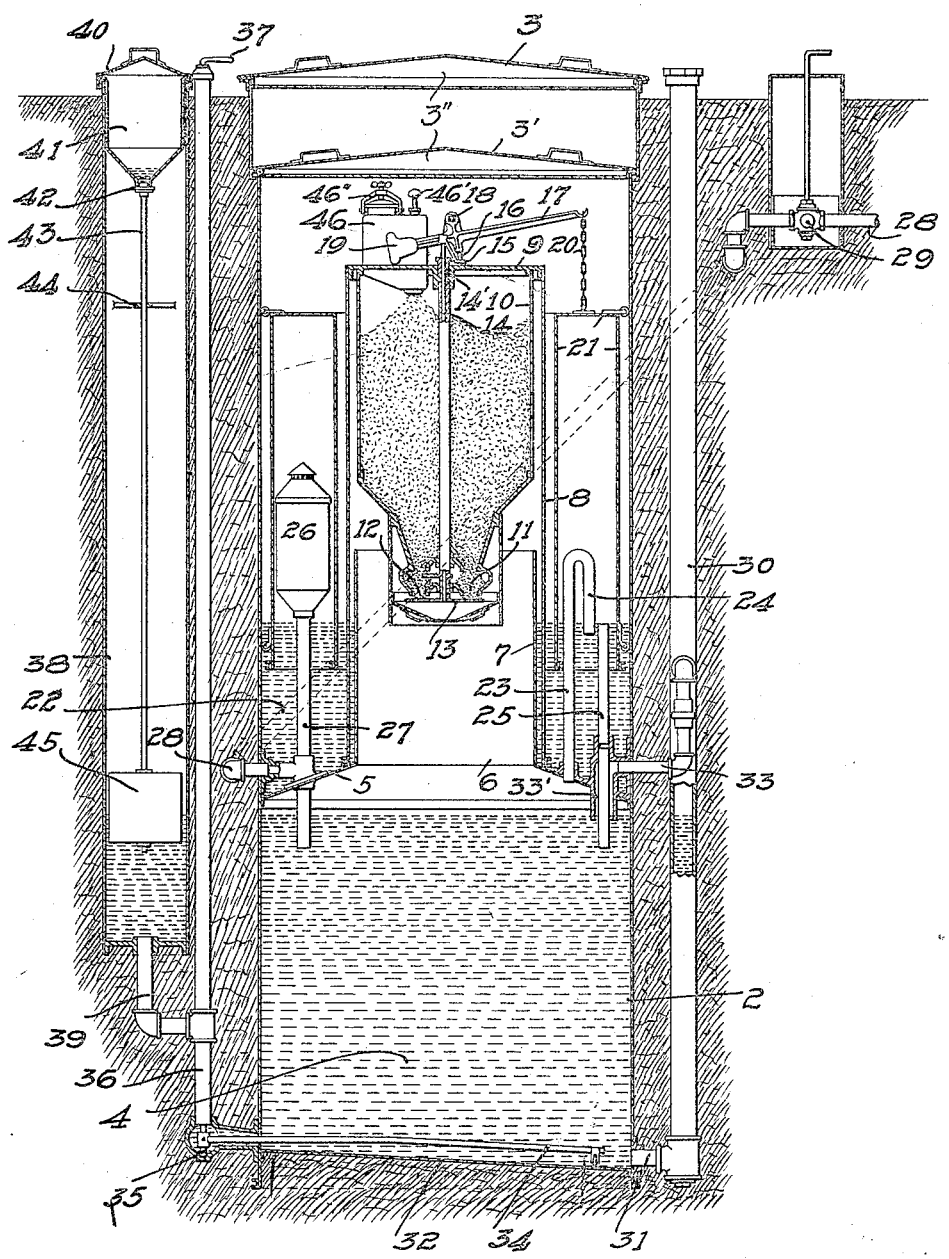

CLAUD J. CLEFTON, OF OWATONNA, MINNESOTA, ASSIGNOR TO THE CLEFTON COMPANY, OF OWATONNA, MINNESOTA, A CORPORATION OF MINNESOTA.

GAS-GENERATOR.

1,133,617.   Specification of Letters Patent.   Patented Mar. 30, 1915.

Application filed August 2, 1913. Serial No. 782,639.

*To all whom it may concern:*

Be it known that I, CLAUD J. CLEFTON, a citizen of the United States, resident of Owatonna, county of Steele, State of Minnesota, have invented certain new and useful Improvements in Gas-Generators, of which the following is a specification.

My invention relates to acetylene gas generators and the object of the invention is to improve the apparatus shown and described in my application for Letters Patent of the United States filed July 27, 1912, Serial No. 711,854.

A further object is to provide improved means for removing the ashes or residuum from the bottom of the tank.

A further object is to provide means for conveniently introducing water to a tank that is buried in the ground.

Other objects of the invention will appear from the following detailed description.

The invention consists generally in various constructions and combinations, all as hereinafter described and particularly pointed out in the claims.

In the accompanying drawings forming part of this specification, the figure is a vertical sectional view illustrating an acetylene generator embodying my invention.

In the drawing, 2 represents a tank, shown buried in the ground, having an outer cover 3 and an inner cover 3', spaced apart to form a dead air chamber between them to prevent the generator from being affected by the action of frost. Each cover has an inner and an outer wall, as shown, forming an air chamber 3'' between the walls and thereby providing three dead air spaces in the top of the generator. I have found that this construction effectually prevents the generator from being affected by the action of frost.

In the bottom of the tank 2 is a chamber 4 containing a supply of water and into which the carbid is discharged from above, the ashes or residuum settling to the bottom of the tank. Near the middle portion of the tank 2 is a cone-shaped ring 5, secured to the walls of the tank and having inwardly converging walls with a central opening 6 leading to an upright sleeve 7 having an open top. A second sleeve 8 incloses the sleeve 7 and is spaced therefrom and rests upon the ring 5 and is provided with a top 9. A carbid holder 10 is arranged within the sleeve 8 and has two groups of discharge ports 11 and 12 arranged one above another in the bottom of the holder. A valve 13 consists of two blades, also arranged one above another at right angles to each other and adapted to swing under the ports 11 and 12 and close the passages therethrough, one blade closing the ports of one pair while the other blade is in its open position to allow the carbid to flow through the ports of the other pair. Thus when the lower ports are open the upper ones will be closed, or vice versa. This device for feeding the carbid forms the subject matter of my application filed December 20, 1912, Serial No. 739,276. This valve has a stem 14 passing through a stuffing box 14' and an arm 15 is mounted on said stem and rotated by means of an arm 16 carried by a lever 17 that is pivoted at 18 and has a weight 19 at one end and a flexible connection 20 at its other end with a gas bell 21 which depends within the space between the sleeve 8 and the wall of the tank. The space above the ring 5 I will designate as the chamber 22, and is adapted to contain a supply of water independently of the chamber 4 and in this water the gas bell 21 is submerged. A pipe 23 leads from the chamber 4 and has a downwardly turned end 24 within the gas bell and submerged slightly in the water in the chamber 22. The gas entering the chamber 23 flows down through the end 24 and through the water in which said end is submerged and is thoroughly washed before entering the gas bell. A relief pipe 25 also leads from the space within the gas bell through the ring 5 to a point below the water in the tank 4. This relief or overflow pipe allows the water to flow down into the chamber 4 and maintains a uniform level above the ring 5 and submerges the end of the pipe 24 sufficiently to insure the washing of the gas while allowing it to flow from the generating tank into the gas bell.

A filter 26 is arranged within the gas bell and supported on a pipe 27 which extends down through the ring 5 into the water in the chamber 4. The gas enters the upper portion of the filter and passes down to a point where the pipe 27 is connected with the service pipe 28. A valve 29 is mounted in the service pipe and has means for convenient operation thereof outside of the generator. The lower end of the pipe 27, submerged in the water in the chamber 4, relieves the filter and the upper portion of the pipe 27 of condensation and extends a sufficient distance into the water in the tank 4 to prevent the gas from flowing therein directly to the service pipe instead of first entering the gas bell. A pipe 30 is provided outside and near the walls of the tank and has one end projecting above the surface of the ground to receive a pump rod inserted therein. The lower end of the pipe 30 has a connection at 31 with the chamber 4 above and near an inclined plate 32 and through this opening the residuum of the carbid and the contents of the tank may be pumped whenever desired without the necessity of removing the cover, gas bell or the carbid holder. When it is desired to remove the residuum and the contents of the tank, a suitable pump is inserted into the pipe 30 to a point below the connection of the pipe 33 with the pipe 30 and the contents of the tank can then be easily and quickly removed. I prefer also to provide a pipe 33 having a coupling connecting it with the pipe 30 and communicating with a sleeve 33′ preferably cast with the ring 5 and depending vertically within the chamber 4. Through this pipe 33 air is admitted around the pump rod to destroy the vacuum in the chamber 4 during the operation of removing its contents. I also provide an agitating device 34 adapted to rest on the inclined floor 32 and projecting outwardly through a wall of the tank 2 and attached to an upright rod 35 arranged within a pipe 36 that is connected at its lower end with the tank 4. The upper end of the rod 35 has an operating handle 37 by means of which the rod may be oscillated to swing the agitating device back and forth on the floor 32 and stir up the residuum of the carbid which may have accumulated thereon.

An upright cylinder 38 is arranged outside the tank and preferably near the pipe 36 and has a pipe connection 39 therewith, and is adapted to contain a supply of water inserted through the top of the cylinder. A cover 40 is provided for said cylinder and a can 41 having a hopper bottom is adapted to fit within the upper end of the cylinder and is provided with a discharge opening that is closed by a valve 42 mounted on the upper end of a rod 43 and is slidable in a guide 44. A float 45 on the lower end of said rod is adapted to rest on the water in the cylinder and regulate the discharge of the water from the can 41 into the cylinder. To supply the cylinder with water it will only be necessary to raise the cover 40 and fill the can, and as the float 45 falls, the valve will be opened and the water will flow from the can into the cylinder and from thence into the generator. Obviously, the water in the cylinder will be on a level with the water in the tank, and this level will be maintained during the operation of the generator.

I prefer to mount an auxiliary carbid filler 46 on the top 9 of the carbid holder 10, said filler being adapted to contain a one night's supply of carbid. This filler is utilized in case it is discovered at night that the supply of carbid in the holder is nearly exhausted and at such time the supply in the auxiliary filler may be released and sufficient carbid delivered to the holder to run the generator through the night. An operating handle 46′ is provided in the filler, connected with a valve, (not shown) for releasing the contents of the filler and allowing it to flow into the holder beneath. With this device it is unnecessary to fill the carbid holder after dark and as the auxiliary holder can be easily reached by lifting the covers of the generator. The device has been found a very convenient adjunct to the machine. This carbid filler device has its cover secured by a clamp 46″, making it thoroughly gas tight.

I claim as my invention:—

1. An acetylene generator comprising a tank adapted to contain a supply of water, a pipe communicating with said tank, a sludge agitator having an operating rod within said pipe, a reservoir communicating with said tank through said pipe and means regulated by the height of the water in said reservoir for maintaining a predetermined level in said tank.

2. An acetylene generator comprising a tank, a wall therein dividing the interior of said tank into an upper and lower water chamber, a pipe communicating with the open air and with said lower chamber and through which the sludge and residuum in the lower chamber may be removed, a branch pipe leading from said sludge removing pipe above the level of the water therein through the wall of said generator and into said lower chamber, whereby air will be admitted into said chamber during the sludge removing operation.

3. An acetylene generator comprising a tank adapted to contain a supply of water, a pipe communicating with said tank, and serving to receive a sludge operating rod and connect a water reservoir with said tank, a sludge agitator having an operating rod within said pipe, a reservoir communicating with said tank through said pipe, said reservoir having a water supply means and a valve therefor, a float within said reservoir connected with said valve for regulating the delivery of water to said reservoir with the rise and fall of water in said tank.

4. An acetylene generator comprising a tank adapted to be set into the ground and having an open top and cover, a reservoir also adapted to be set in the ground, a water can fitting within said reservoir and having a valve in the bottom of said can, a pipe connecting the lower portion of said reservoir with the corresponding portion of said tank, and a float arranged in said reservoir and having a connection with said valve for opening or closing it with the lowering and raising of the level of the water in said reservoir.

5. An acetylene generator comprising a tank adapted to contain a supply of water, a reservoir arranged adjacent to said tank and having a pipe connection therewith, a water can fitting within said reservoir and having a cover, a discharge port, a valve for said port, a rod connected with said valve and depending within said reservoir, and a float carried by said rod for opening or closing said valve with the change of level of the water in said tank and reservoir.

6. An acetylene generator comprising a tank adapted to contain a supply of water, a pipe communicating with the open air and with said tank for the removal of the sludge therefrom, said pipe and tank having a communicating passage between them for the admission of air to said tank to destroy the vacuum during the sludge removing operation, a water supply pipe for said tank, said passage allowing the escape of air from said tank during the filling thereof through said water supply pipe.

7. An acetylene generator comprising a tank adapted to contain a supply of water, a pipe communicating with said tank, a sludge agitator operating rod within said pipe, a receptacle communicating with said pipe, a water can mounted in said receptacle, a valve for said water can, a float within said receptacle connected with said valve, the water in said tank and said receptacle being maintained on a uniform level through the movement of said float.

8. An acetylene generator comprising a tank, a reservoir, a water can fitting therein and having a cover and a valve, a pipe connecting said reservoir with said tank and a float arranged in said reservoir and connected with said valve for opening or closing it with the lowering or raising of the level of the water in said reservoir.

In witness whereof, I have hereunto set my hand this 10th day of May, 1913.

CLAUD J. CLEFTON.

Witnesses:
A. W. SAWYER,
J. A. SAWYER.

Copies of this patent may be obtained for five cents each, by addressing the "Commissioner of Patents, Washington, D. C."